United States Patent
Baugh

(10) Patent No.: US 10,987,709 B2
(45) Date of Patent: Apr. 27, 2021

(54) FREE RUNNING PIG FOR PIPELINE REMEDIATION

(71) Applicant: Benton Frederick Baugh, Houston, TX (US)

(72) Inventor: Benton Frederick Baugh, Houston, TX (US)

( * ) Notice: Subject to any disclaimer, the term of this patent is extended or adjusted under 35 U.S.C. 154(b) by 112 days.

(21) Appl. No.: 16/460,523

(22) Filed: Jul. 2, 2019

(65) Prior Publication Data
US 2021/0003242 A1    Jan. 7, 2021

(51) Int. Cl.
| | |
|---|---|
| *B08B 9/051* | (2006.01) |
| *F16L 55/32* | (2006.01) |
| *B08B 9/049* | (2006.01) |
| *B08B 9/055* | (2006.01) |
| *F16L 55/40* | (2006.01) |
| *F16L 55/26* | (2006.01) |
| *F16L 55/38* | (2006.01) |
| *F16L 55/28* | (2006.01) |
| *F16L 101/12* | (2006.01) |
| *F16L 101/70* | (2006.01) |
| *F16L 55/46* | (2006.01) |
| *F16L 55/48* | (2006.01) |
| *F16L 101/10* | (2006.01) |

(52) U.S. Cl.
CPC ............. *B08B 9/051* (2013.01); *B08B 9/049* (2013.01); *B08B 9/055* (2013.01); *B08B 9/0558* (2013.01); *F16L 55/26* (2013.01); *F16L 55/28* (2013.01); *F16L 55/32* (2013.01); *F16L 55/38* (2013.01); *F16L 55/40* (2013.01); *F16L 55/46* (2013.01); *F16L 55/48* (2013.01); *F16L 2101/10* (2013.01); *F16L 2101/12* (2013.01); *F16L 2101/70* (2013.01)

(58) Field of Classification Search
CPC ......... B08B 9/049; B08B 9/051; B08B 9/053; B08B 9/055; B08B 9/0553; B08B 9/0557; B08B 9/0558; B08B 2209/053; B08B 2209/055; F16L 55/26; F16L 55/28; F16L 55/30; F16L 55/32; F16L 55/34; F16L 55/36; F16L 55/38; F16L 55/40; F16L 2101/10; F16L 2101/12; F16L 2101/70
USPC ............ 15/104.09, 104.12–104.14, 104.061, 15/104.063; 134/167 C, 168 C, 169 C, 134/166 C
See application file for complete search history.

(56) References Cited

U.S. PATENT DOCUMENTS 4,055,315 A * 10/1977 Gvelesiani ............. B65G 51/04
406/185
6,122,791 A    9/2000 Baugh
(Continued)

FOREIGN PATENT DOCUMENTS

| WO | 86/01751 | * | 3/1986 |
| WO | 94/12827 | * | 6/1994 |
| WO | 2005/057076 | * | 6/2005 |

*Primary Examiner* — Mark Spisich

(57) ABSTRACT

A remediation pig for cleaning a pipeline of wax or paraffin mechanically, with heating, and/or with jetting, comprising a body having an axis, an impeller mounted in the body to receive power from the flowing fluid within the pipeline, wheels mounted on the body for contacting the internal bore of the pipeline, the wheels being powered by the power received from the impeller and being mounted in a skewed position relative to a plane perpendicular to the axis such that as the wheels roll on the internal bore the remediation pig will move along the pipeline.

17 Claims, 5 Drawing Sheets

(56) References Cited

U.S. PATENT DOCUMENTS

| | | |
|---|---|---|
| 6,260,617 B1 | 7/2001 | Baugh |
| 7,927,426 B2 | 4/2011 | Baugh |
| 7,998,276 B1 | 8/2011 | Baugh |

* cited by examiner

FREE RUNNING PIG FOR PIPELINE REMEDIATION

TECHNICAL FIELD

This invention relates to cleaning a pipeline by using flow within the pipeline to power movement of a cleaning pig using power drawn from the pipeline flow to power the cleaning pig and to operate cutters, heaters, jetting, and other cleaning methods.

BACKGROUND OF THE INVENTION

The field of this invention is that of tools and methods used for the cleaning of pipelines, especially the long, extended reach pipelines in offshore areas. As hot production crude is produced from the reservoirs below the ocean floor up to the wellhead equipment at the ocean floor and then through pipelines along the ocean floor, it is cooled by the relatively cool temperature of the ocean water. In deep water, the temperature can be a cold as 34 degrees Fahrenheit.

A characteristic common to a majority of the oil produced is that there is a paraffin component to the oil which will deposit on the walls of the pipeline and become a solid at temperatures well above 34 degrees Fahrenheit. In fact, some of the paraffins become solid at temperatures above 110 degrees Fahrenheit, and can be deposited or plated on the internal diameters of the pipelines at any expected ambient temperature. The process is similar to discussions of the blocking of the arteries of a human being, with a thicker coating building up with time. Some of the pipelines have become so plugged that more than 90% of the flow area is blocked with waxes or paraffins.

Typically, the wall becomes layered with paraffin as the temperature of the oil goes below the solidification temperature of the particular paraffins in the produced fluids. The paraffins act as a sort of insulation to the flowing fluids in the pipeline, allowing it to maintain a higher temperature for a greater distance. The effect of this is to extend the distance along the pipeline which the paraffin is plating onto the internal diameter of the pipeline.

A common cure for the paraffin plating on the internal diameter of the pipeline is to insert a passive pig into the flow stream and let the pig remove some of the paraffin. A passive pig is typically a cylindrical or spherical tool which will brush against the internal diameter of the pipeline in hopes of removing the deposited paraffins. In pipelines with a high incidence of deposited paraffins, a regular maintenance of passive pigs is normally prescribed as a preventative against pipeline blockages.

One problem with the passive pigs is that the deposited paraffins are relatively soft and contain a lot of oil. To some extent, the passive pigs actually compress the paraffins against the wall and squeeze the oil out, leaving a harder and stronger paraffin remaining.

A second problem with passive pigs is that when the paraffin layer on the internal diameter of the pipe is too thick, sloughing off may occur. If the paraffin starts to separate from the wall and continues, the pig begins to literally plow a block of paraffin ahead of itself. It will continue driving more and more paraffin off the wall of the pipeline until the pressure of the pipeline will no longer be able to move the mass. At that time you have a full pipeline blockage, which frequently cannot be moved by pressure from either end.

A third problem with passive pigs is that they move the same speed as the flow in the pipeline. If they were in fact to clean a significant amount of paraffin from the walls of the pipelines, it stays directly in front of the passive pig. If it is a significant amount, it is literally building its own blockage in the pipeline.

After a blockage, the plug of paraffin must be removed by chemicals or mechanical jetting. Characteristically, the way chemicals are deployed to the location of the blockage is to use a string of coiled pipe or coiled tubing which is unreeled into the pipeline to provide a circulation path for the circulation of chemicals. As the end of the coiled pipe reaches the location of the blockage, the chemicals are circulated either out the coiled tubing and back through the annulus outside of the coiled tubing and inside the pipeline, or the flow will be in the opposite direction.

Before the pipelines are completely blocked, wire rope pigs, such as are described in U.S. Pat. No. 7,998,276, offer an improved means for removing the paraffins plated onto the inner walls of the pipelines by restraining the movement of the pig with a wire rope and allowing a differential to be built up across the pig to provide a jetting pressure. The jetting pressure can compliment or substitute for the chemicals for improved cleaning. The wire rope pig provides an internal valve which allows the flow through the pig to be bypassed through a vent to allow the pig to be pulled back without pulling all the pipeline fluids back with it.

One of the problems with using coiled tubing or wire rope pigs for remediation is that in a long pipeline, e.g. 10 miles long, the cooling down to the wax plating will occur near the source or in the range of one mile from the subsea wellhead. The access for inserting the coiled tubing will usually be at the other end of the pipeline or nine miles away. Nine miles is a difficult distance to handle with mechanical interventions such as coiled tubing.

All of the methods described have required the interruption of the revenue producing production and the use of a cable, tube, pipe, or hose to be connected to the cleaning pig to control the position of the cleaning pig. With all the developments in cleaning pigs in the past 100 years, the ability to remove a significant amount of wax buildup from the walls of a pipeline combined with the cleaning pig moving slower than the pipeline flow has not been accomplished, unless the cleaning pig was restrained by a cable, tube, or hose.

BRIEF SUMMARY OF THE INVENTION

The object of this invention is to provide a method of cleaning deposits from the internal walls of a pipeline using a cleaning pig which is released into the pipeline and is not restrained by a cable, hose, or tube.

A second objective of this invention is to provide a method of cleaning deposits from the internal walls of a pipeline where the cleaning power is drawn from the flowing fluid within the pipeline.

A third objective of this invention is to provide a method of cleaning deposits from the internal walls of a pipeline using a cleaning pig which is moving slower than the speed of the fluid flow in the pipeline.

Another objective of this invention is to provide a remediation method which will focus on the area of the plating of the wax rather than having to clean the entire pipeline.

Another objective of this invention is to provide a method of cleaning deposits from the internal walls of a pipeline using a pig which travels in both directions along the bore of the pipeline between predetermined points.

Another objective of the invention is to provide for the recovery of the cleaning pig at a desired time.

Another objective of the invention is to provide a method of emergency recovery of the pig when an operational failure happens in the pig.

DETAILED DESCRIPTION OF THE INVENTION

Figure 1:
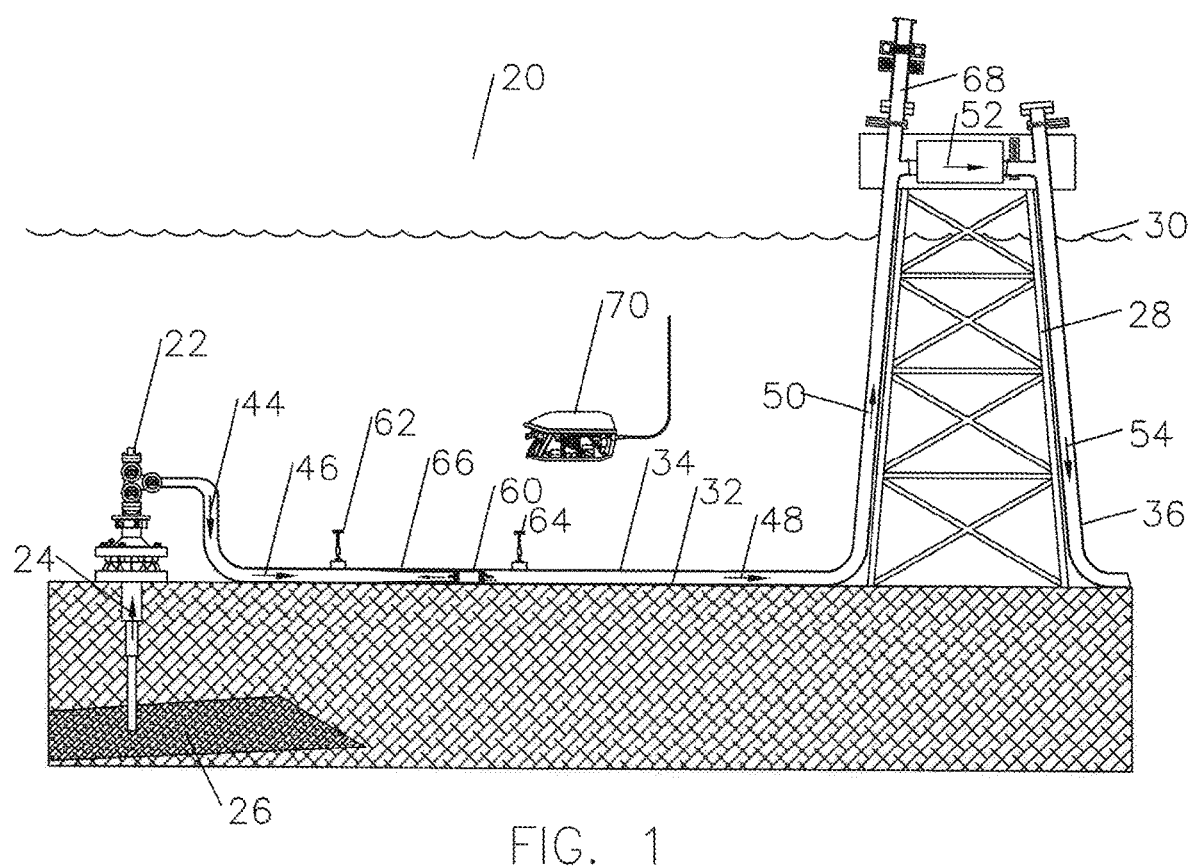
FIG. 1 is a view of a subsea pipeline system between subsea Christmas tree and a platform utilizing the features of this invention in cleaning a section of the pipeline.

Referring now to FIG. 1, a view of a system 20 utilizing the present invention is shown with a subsea wellhead 22 producing a relatively hot and wax filled oil 24 from a subsurface reservoir 26, a platform 28, the ocean surface 30, the seafloor 32, a seafloor pipeline 34 connecting the subsea wellhead 22 to platform 28, and an export pipeline 36 which takes the hydrocarbons to a delivery point which is likely the shore. The flow of the oil 24 is generally indicated by arrows 44-54.

Free running pig 60 is shown within pipeline 34 on seafloor 32, presently located between devices 62 and 64. Devices 62 and 64 are likely strong magnets, but can be a variety of other suitable components. If it is determined that the wax plating 66 in this pipeline occurs between distances such as 0.8 miles and 1.2 miles from the subsea wellhead 22, these devices may be landed at locations such as 0.5 and 1.5 miles from the subsea wellhead 22. The free running pig 60 will be inserted at the platform 28 in pig launcher 68 and set to run in the pipeline against the flow towards the subsea wellhead 22 with device 62 in place. When the free running pig 60 passes the location for device 64, device 64 can be also landed in place. When the free running pig 60 reaches the device 62, it will sense the device and reverse its travel direction and move back towards the location of device 64. Device 64 can be landed at this time. On reaching device 64 and sensing it, the pig will again reverse its direction and go back towards device 62. The free running pig will then travel back and forth between the locations of devices 62 and 64. Alternately, both devices 62 and 64 can be in place and free running pig 60 can be programmed to ignore the first device it encounters. Remotely operated vehicle or ROV 70 is shown after having landed the device 64.

Figure 2:
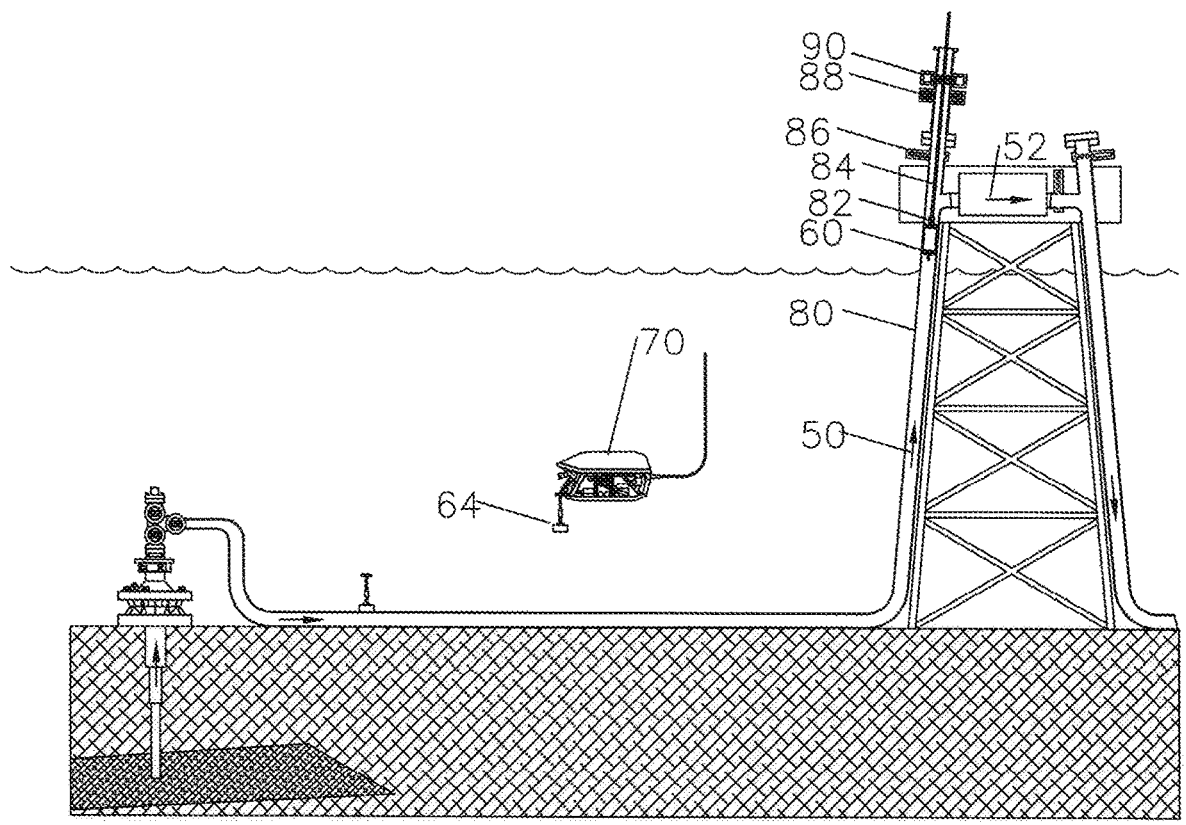
FIG. 2 is a similar view as shown in FIG. 1 showing the free running pig either ready to be released or just captured and with the ROV ready to land or having just recovered a location indicator to define the extent of the regular pipeline cleaning.

Referring now to FIG. 2, the free running pig 60 has been inserted into the flow in pipeline section 80 by connector 82 on rod 84 through valve 86 and blowout preventers 88 and 90. At this point the flow as seen in arrows 50 and 52 will be passing through free running pig 60 such that free running pig 60 can be powered. In this case the ROV 70 is holding the device 64, ready to land it after the free running pig 60 has passed. FIG. 2 also illustrates the means of recovery of the free running pig 60 for occasional servicing as ROV 70 has picked up device 64, so free running pig 60 continues to travel in the direction of the flow until captured again by connector 82 on rod 84.

Figure 3:
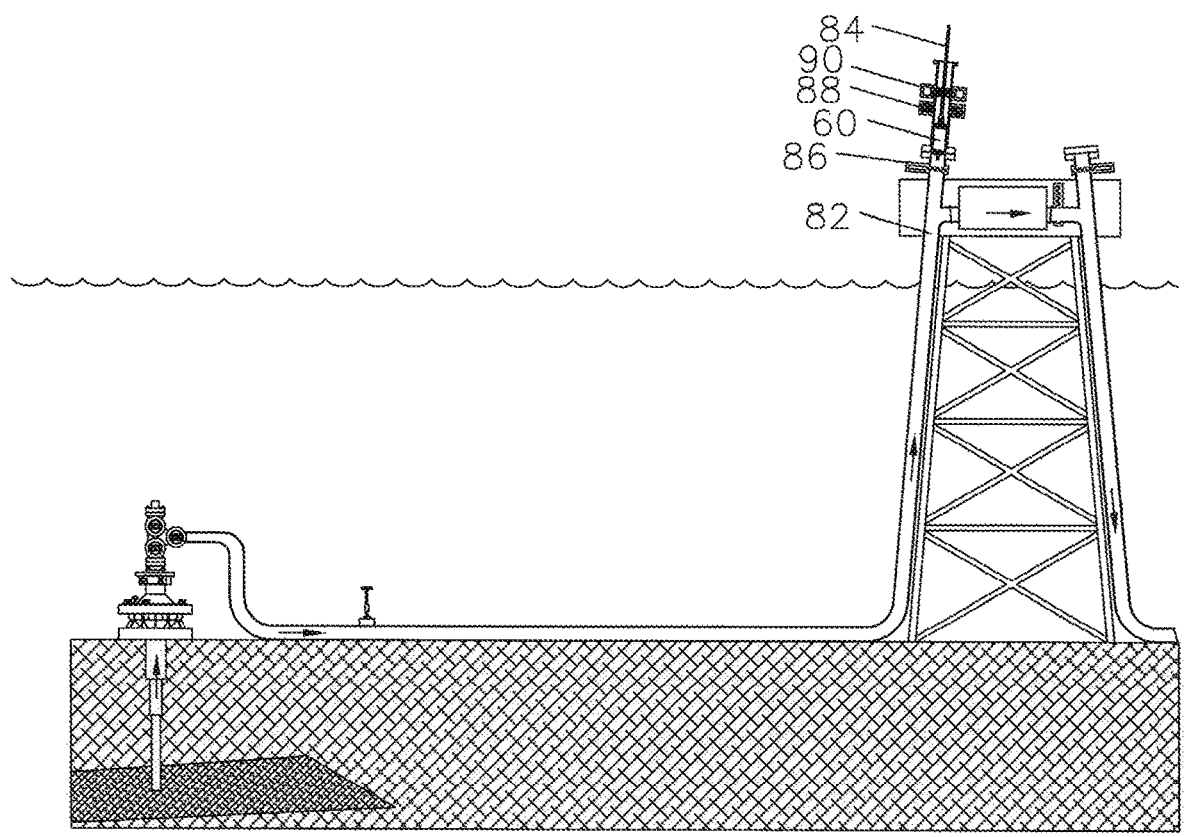
FIG. 3 is a similar view as shown in FIG. 2 showing the free running pig in a pig launcher isolated from the flow by a valve as might be seen when ready to start cleaning operations or when cleaning operations have been stopped to service the pig.

Referring now to FIG. 3, the rod 84 has been retracted pulling the free running pig 60 to a position above valve 86, which is now closed. The blowout preventers 88 and 90 can be opened and the free running pig 60 can be removed for servicing.

Figure 4:
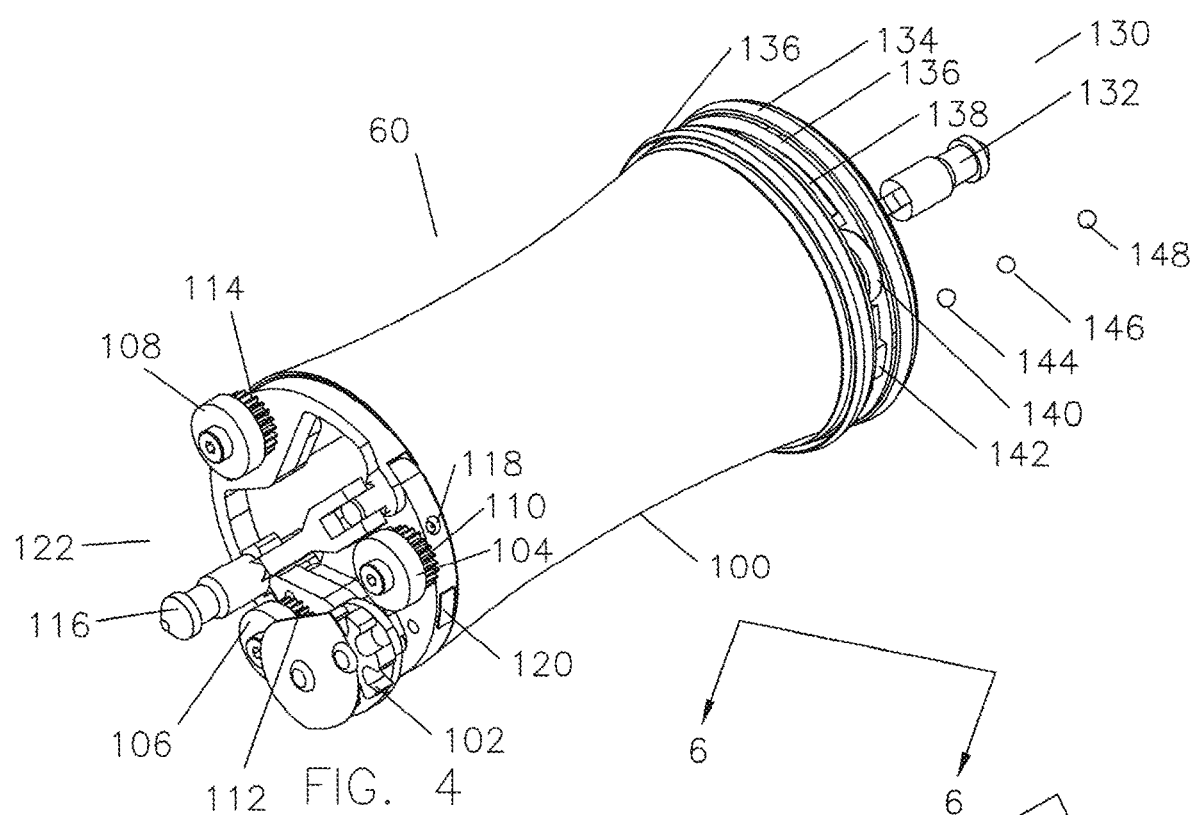
FIG. 4 is a perspective view of a free running pig showing the forward end of the pig.

Referring now to FIG. 4, free running pig 60 is shown in a perspective showing cover 100 which has a smaller diameter near the center to allow it to pass through pipeline bends, rotating cutter 102, power wheels 104, 106, and 108 with gears 110, 112, and 114 to receive the driving power, fishing neck 116, jet nozzle 118, and sensor 120 at the forward end 122. Power wheels 104, 106, and 108 appear to be generally in a plane perpendicular to the centerline of the free running pig 60, but are slightly skewed to the plane such that in a single rotation of the pig, it will advance in the pipeline approximately the distance of the width of the cutter 102.

At the rear end 130 fishing neck 132, seals 134 and 136, heating element 138, wheel 140, sensor 142 and wax balls 144-148 can be seen.

Figure 5:
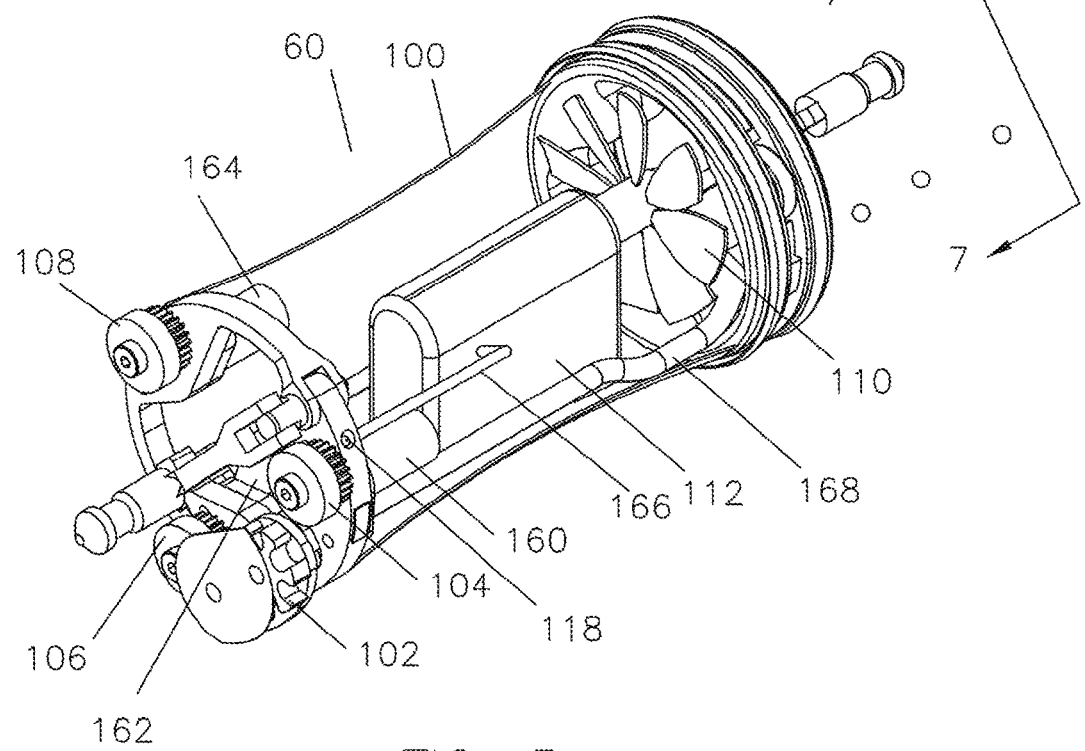
FIG. 5 is a similar perspective view of a free running pig as FIG. 4 with a portion of the cover removed to show internal parts.

Referring now to FIG. 5, a portion of cover 100 has been removed to show some of the internal parts. Motors 160, 162, and 164 are shown to power wheels 104, 106, and 108. Impeller 110 is positioned in the flow through the free running pig 60 to harvest the power of the flowing fluid. The power is collected in control box 112 and distributed as required. The power can be collected as electric energy, hydraulic energy, or mechanical energy, or a combination of the three. Three methods of remediation are illustrated, cutting the wax or paraffin with the rotating cutter 102, jetting with the jet nozzle 118, and melting with the heating element 138. Pipe 166 illustrates producing fluid under pressure within control box 112 and sending it to jet nozzle 118. Pipe 168 illustrates the cutter 102 putting cut wax into pipe 168 and delivering it to a device to be described which will release it into the flow.

Figure 6:
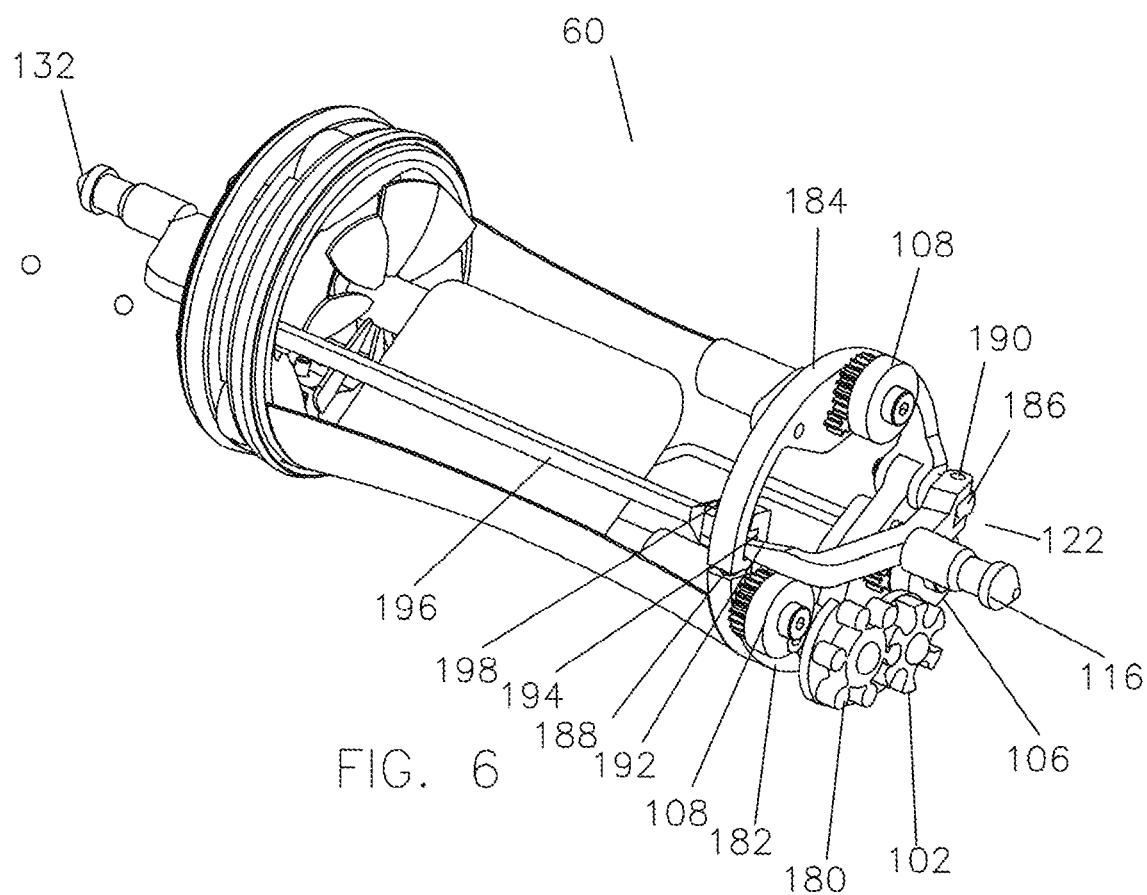
FIG. 6 is a perspective view of a free running pig taken along lines "6-6" of FIG. 5 to show how the wheel loading on the walls is released for emergency recovery.

Referring now to FIG. 6, cutter 102 is shown with the cover removed, exposing pumper 180 which meshes with cutter 102. When cutter 102 cuts some wax from the wall of the pipeline, the wax rotates around until it encounters the pumper 180, which fills all the space between the cutter blades. The cover (removed) prevents the wax from going in one direction, so it is forced or "pumped" the opposite direction into pipe 168. The front structural frame of the free running pig 60 is divided into a lower half 182 and an upper half 184 which are pivotably connected about pin 186. Spring 188 tend to push the two halves apart, and provides the frictional preload for power wheels 104, 106 and 108. Fishing neck 116 is pivotably mounted on pin 190 and is available for recovery of the free running pig 60 from the forward end 122. Alternately as the flow is coming from the forward end 122, if a pig is inserted into the flow and moves with the flow, it will impact the end of fishing neck 116 pushing it forward about pin 190 causing the tapered section 192 to be pushed into gap 194 which will compress spring 188 and relieve the load on power wheels 104, 106, and 108, allowing the free running pig 60 to be easily pushed back to platform 28. Alternately, if the fishing neck 132 is approached and engaged by an appropriate fishing tool and pulled, the linkage 196 connects to the tapered section 192 by pin 196 it allows the fishing tool to release the load on the power wheels 104, 106, and 108.

Figure 7:
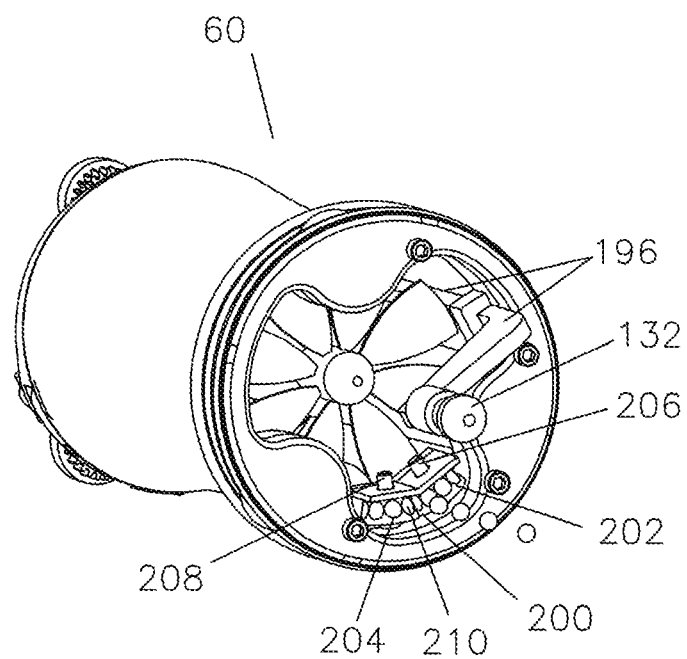
FIG. 7 is a perspective view of a free running pig taken along lines "7-7" of FIG. 5 to show how the wax cut from the walls in the front of the pig is formed into solid balls to make them unlikely to stick to the pipeline walls during the cleaning operations.

Referring now to FIG. 7 a perspective view of free running pig 60 is seen taken generally along lines "7-7" of FIG. 5. A ball forming assembly 200 is seen with two wheels 202 and 204 pivotably mounted about axles 206 and 208, each having a series of semi-circular recesses 210 in their outer surfaces. As wax is collected in rotating cutters 102 and pumped into pipe 168, it will exit into the ball forming assembly 200. Accumulating wax will fill the semi-circular recesses at the end of pipe 168 and cause the wheels 202 and 204 to rotate. As they rotate with fully formed balls of wax in the recesses, they will separate, tending to release the balls of wax into the flow. Some of the flow from pipe 166 can be diverted into the axles 206 and 208 and then into wheels 202 and 204 to pump the formed balls out of their semi-circular recesses to make sure they are appropriately released. Various shapes of cut wax can be released, however, the ball shape will provide the least possible contact area between the cut wax and the internal wall of the pipeline to make them the least likely to stick to the pipeline internal walls.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A remediation pig for cleaning a pipeline of wax or paraffin, comprising
    a body having an axis,
    an impeller mounted in said body to receive power from the flowing fluid within said pipeline,
    wheels mounted on said body for contacting the internal bore of said pipeline, said wheels being powered by said power received from said impeller and being mounted in a skewed position relative to a plane perpendicular to said axis such that as said wheels roll on said internal bore said remediation pig will move along said pipeline,
further comprising one or more rotating cutters proximate one end of said remediation pig to remove said wax from said bore.

2. The apparatus of claim 1 further comprising mechanically forcing said wax out of said cutter in a preferred direction.

3. The apparatus of claim 2 further comprising opposing rollers which form wax cut by said rotating cutters into a shape.

4. The apparatus of claim 1 further comprising using a portion of said power to pump a portion of said flowing fluid through a jetting nozzle aimed at said internal bore of said pipeline to remediate said internal bore.

5. The apparatus of claim 1 further comprising using said power to heat a portion of said flowing fluid to melt said wax or paraffin.

6. The apparatus of claim 5 further comprising mounting heating elements in a chamber to allow said portion of said flowing fluid in said chamber to be heated.

7. The apparatus of claim 1 further comprising providing one or more sensors on said remediation pig and a distal location device on said pipeline such that when said one or more sensors detects said distal location device, the direction of movement of said remediation pig is reversed.

8. The apparatus of claim 7 further comprising said distal location device is a magnet.

9. The apparatus of claim 7 further comprising providing a proximate location device on said pipeline such that when said remediation pig returns to a desired proximate distance of travel and said one or more sensors detects said proximate location device said direction of movement of said remediation pig is reversed.

10. A remediation pig for cleaning a pipeline with a flowing fluid of wax or paraffin plated on the inner bore of said pipeline, comprising
    a body having an axis,
    an impeller mounted in said body to receive power from the flow within said pipeline,
    wheels mounted on said body for contacting and being loaded against the internal bore of said pipeline, said wheels being powered by said power received from said impeller and being mounted at an acute angle relative to a plane perpendicular to said axis such that as said wheels roll on said internal bore said remediation pig will move along said pipeline,
    further comprising the loading of said powered rollers said loading of said wheels against said inner bore of said pipeline is relieved by pushing on a first end of said remediation pig.

11. The apparatus of claim 10 further comprising said loading of said wheels against said inner bore of said pipeline is relieved by pulling on a second end of said remediation pig.

12. The apparatus of claim 10, further comprising one or more rotating cutters proximate one end of said remediation pig to remove said wax from said bore.

13. The apparatus of claim 12 further comprising opposing rollers which form wax cut by said rotating cutters into a generally spherical shape.

14. The apparatus of claim 10 further comprising using a portion of said power to pump a portion of said flowing fluid through a jetting nozzle aimed at said internal bore of said pipeline to remediate said internal bore.

15. The apparatus of claim 10 further comprising providing a distal sensor on said remediation pig and a distal location device on said pipeline such that when said fistdistal sensor detects said distal location device, the direction of movement of said remediation pig is reversed.

16. The apparatus of claim 15 further comprising providing a proximate sensor on said remediation pig and a proximate location device on said pipeline such that when said remediation pig returns to a desired proximate distance of travel and said proximate sensor detects said proximate location device said direction of movement of said remediation pig is reversed.

17. The apparatus of claim 16 further comprising the removal of said proximate location device from said pipeline will cause said remediation pig to return to the entry point into said pipeline.

\* \* \* \* \*